United States Patent [19]

Bailey

[11] 4,361,054
[45] Nov. 30, 1982

[54] HOT-WIRE ANEMOMETER GYRO PICKOFF

[75] Inventor: Escar L. Bailey, Athens, Ala.

[73] Assignee: The United States of America as represented by the Secretary of the Army, Washington, D.C.

[21] Appl. No.: 213,522

[22] Filed: Dec. 5, 1980

[51] Int. Cl.³ .............................................. G01C 19/28
[52] U.S. Cl. .................................. 74/5.6 D; 73/505; 74/5.6 R
[58] Field of Search ............... 74/5.6 D, 5.6 R, 5.6 B; 73/505; 33/363 Q, 317 R

[56] References Cited

U.S. PATENT DOCUMENTS

| | | | |
|---|---|---|---|
| 2,567,682 | 9/1951 | Silberstein | 74/5.6 D |
| 3,340,740 | 9/1967 | Hall | 74/5.6 B |
| 3,811,328 | 5/1974 | Rodgers et al. | 74/5.6 B |

*Primary Examiner*—Rodney H. Bonck
*Attorney, Agent, or Firm*—Nathan Edelberg; Robert P. Gibson; Robert C. Sims

[57] ABSTRACT

An arrangement of hot-wire anemometers is set partially into the rotor boundary layer so that they form two resistors of a wheatstone bridge circuit for each axis. The hot wire resistors change in resistance according to the angular offset from null of the gyro rotor. The combination of resistance changes is then used in the bridge circuit to provide an electrical signal which is directly proportional to gyro rotor angular offset.

6 Claims, 4 Drawing Figures

HOT-WIRE ANEMOMETER GYRO PICKOFF

DEDICATORY CLAUSE

The invention described herein may be manufactured, used, and licensed by or for the Government for governmental purposes without the payment to us of any royalties thereon.

BACKGROUND OF THE INVENTION

It is a known natural phenomenon that a thin boundary layer of high velocity builds up on a moving solid surface such as a gyro rotor. A technique for sensing this boundary layer around a gyro rotor has recently been developed using a scoop type probe to sense pressures, or pressure differential, in the layer. This gyro output measurement technique has demonstrated good response to offset detection, but is quite noisy due to air turbulence through the scoop. A different type of gyro offset detection is offered here which has several salient advantages in features over the scoop probes.

For several years, the heated sensor technique for fluid flow measurement has advanced steadily. This technique for fluid flow measurement employs the principle of the hot sensor anemometer, which instantaneously measures fluid-flow parameters by sensing the heat transfer between an electrically heated sensor and the flow medium.

The hot-wire anemometer is distinguished by several salient features that offer advantages over other types of flow measurement probes.

a. The device has a very quick and wide frequency response to changes in gas velocities and is the best practical means for accurately measuring the rapid fluctuations caused by turbulence, eddies, and gusts.

b. Its small size offers high spatial resolution and low interference to fluid flow. Sensor diameters are typically 0.0001" to 0.1".

c. It has excellent sensitivity which can repeatedly detect air velocities to one foot per minute.

d. It has excellent system reliability since there are no moving parts.

e. Compatibility with external signal-processing and data-gathering systems is excellent with high-level signal outputs of 0 to 10 volts.

f. Self-compensation for ambient temperature changes can be obtained with appropriate circuit.

g. The signal output for either linearized or nonlinearized anemometer output can be scaled in direct mass flow units (lbs/min, or SCFM) and required no pressure correction.

h. The system accuracy is repeatable to 0.1% of reading with obtainable resolution of 0.01% of full scale. Calibration accuracy is typically 2% of reading ±0.02% of full scale over a 100 to 1 flow range.

DESCRIPTION OF THE BEST MODE AND PREFERRED EMBODIMENTS

Figure 1:
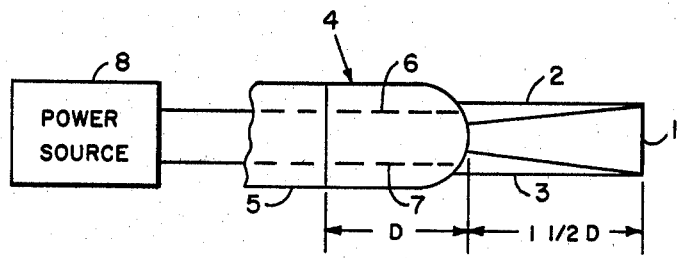
FIG. 1 illustrates the hot-wire sensor of the present invention.

FIG. 1 shows that the hot-wire anemometer contains as a heated sensor 4 a short length of fine platinum wire 1 which is heated by an electric current through stainless steel supports 2 and 3. A tubular structure 5 can contain the electrical connections 6 and 7 to supports 2 and 3 and to the power source 8. The resistance to flow of electricity through the wire 1 is a function of its temperature. Any nonlinear resistor whose resistance changes with temperature can be used. When the sensor is exposed to a flow stream of gas, the hot wire cools and thus changes its resistance. The rate at which heat is lost from the sensor is a direct measure of the fluid velocity. By holding constant either the voltage across the wire or the current through the wire by a suitable circuit, the change in amperes or voltage, respectively, becomes a function of the speed of the gas flow by the wire.

Figure 3:
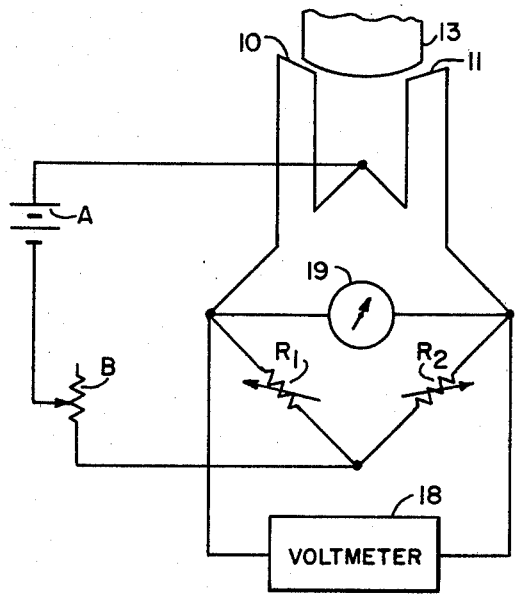
FIG. 3 shows a schematic circuit of a constant voltage bridge circuit.

The heated sensor can be part of a bridge circuit (such as is shown in FIG. 3) that furnishes electrical heating power to the sensor to maintain the temperature of the sensor above the ambient temperature. The hot wire forms one of the resistors of the bridge circuit. The output of the bridge will be proportional to the fluid velocity about the sensor and therefore measures it.

Figure 2:
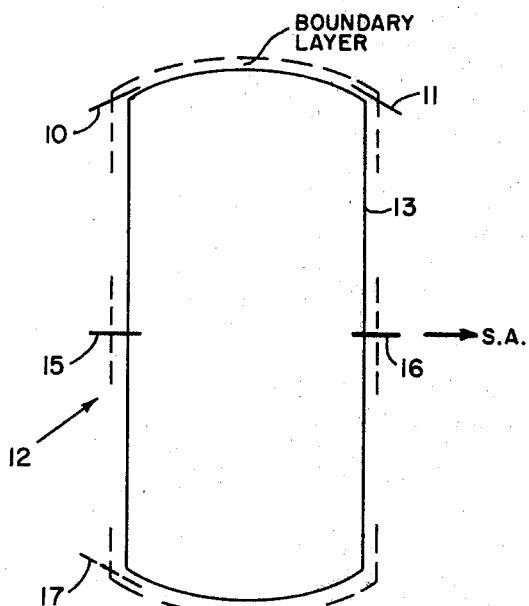
FIG. 2 illustrates the hot-wire probes on a gyro rotor.

As a gyro pickoff (FIG. 2) two hot wires 10 and 11 are used in one axis of the gyro 12 so that each of the two wires form a resistor of a bridge circuit (see FIG. 3). Two heated sensor probes are placed in one of the gyro pickoff planes so that approximately half the hot wire 10 and 11 are imbedded inside the boundary layer while half is outside when the gyro rotor 13 is in the null position. As the rotor is offset, one of the heated sensor probes becomes further into the boundary layer thereby cooling more of the hot wire which decreases its electrical resistance. At the same time, the other heated sensor gets further out of the boundary layer so that there is less cooling of the hot wire and its electrical resistance increases. Both resistance changes contribute to a change in either ampere level or voltage level, depending on whether a constant voltage anemometer circuit or a constant current anemometer circuit is used. A similar arrangement of heated sensor probes 15 and 16 and circuitry is used in the other gyro pickoff lane to complete a two-axis pickoff system. Hot wire 17 show an alternative placement for the first axis.

FIG. 3 shows an anemometer circuit in which the two heated sensors 10 and 11 of one gyro axis are used as two elements of a four element Wheatstone-bridge. Resistors $R_1$ and $R_2$ form the other resistance. The circuit is first adjusted by changing the resistance of $R_1$ and/or $R_2$ so that when the gyro is in the null position and the wires are cooled an equal amount the bridge is balanced. The galvanometer and voltmeter will both read zero and any difference in the characteristics of resistors 10 and 11 will be compensated by the bridge. Then, for an offset in the gyro rotor 13, a change in fluid flow over the wires occurs such that one wire is cooled a greater amount (resistance decreases) while the other wire in the opposite leg of the circuit is cooled a lesser amount (resistance increases). This causes a potential difference across the two legs of the bridge. The voltage 18 or galvanometer 19 readings therefore, are a measure of the average fluid velocity difference across the sensors and is directly proportional to gyro rotor offset. Battery A and variable resistor B determine the amount of current flow through hot wires 10 and 11 during nulling.

Figure 4:
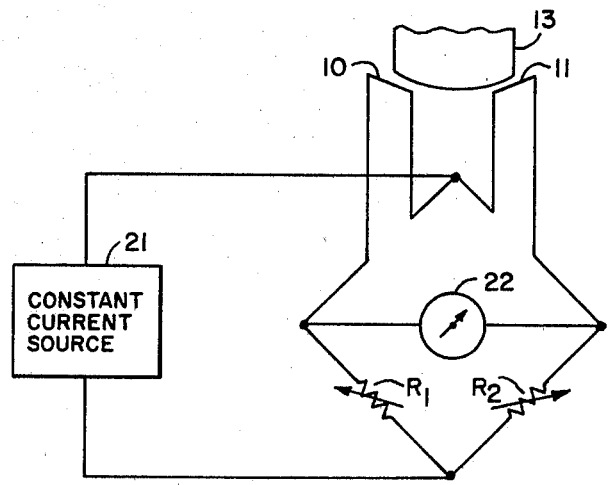
FIG. 4 shows a schematic circuit of a constant current bridge circuit.

FIG. 4 shows a constant current anemometer circuit in which the current to the two hot wire sensors is maintained essentially constant by driving the sensor bridge from a constant current source 21. In this circuit, variable resistance $R_1$ and $R_2$ are first adjusted so that the galvanometer 22 reads zero when the two sensors are exposed to the boundary layer with the gyro rotor in the null position. Then, as the rotor 13 is offset, flow over one of the hot wire sensors is increased so that the wire is cooled (resistance decreases) while the boundary layer flow over the other wire is decreased (resistance increases), both of which causes a change in galvanometer reading. Calibration relates the average velocity difference over the sensors (and thus gyro rotor offset) to galvanometer reading.

The gyro pickoff offered here is a very sensitive and highly responsive instrument that provides a direct electrical output. Sensitivity, repeatability, reliability, and system accuracy should be much greater than any other probe into the boundary layer for detecting flow parameters. The device employs a phenomenon resolution with absolutely no interference to rotor motion which would result in degradation to gyro performance.

I claim:

1. In a system for measuring movement of a rotating means which has a boundary layer of flowing fluid about its rotating surface, the improvement comprising a nonlinear resistor having a length which is long in comparision to its diameter; circuit means connected to said resistor so as to cause current flow through said resistor and to cause said resistor to increase in temperature; said resistor being placed relative to said rotating means such that only a portion of said resistor will be in said boundary layer; when said rotating means moves relatively to said resistor, a different proportion of said resistor will be within said boundary layer; said nonlinear resistor being such that the more of the resistor that is located within the boundary layer, the more the resistor is cooled; and measurement means connected to said resistor to sense the amount of cooling of the resistor, and therefore, the amount of motion of said rotating means relative to said resistor.

2. A system as set forth in claim 1 wherein said nonlineary resistor is nonlinear in respect to temperature.

3. A system as set forth in claim 2 wherein said rotating means is a gyro rotor and said resistor being located to sense moving of one axis of said gyro rotor.

4. A system as set forth in claim 1 or 3 further providing a second nonlinear resistor located relative to the original resistor such that when the rotor moves relative to said original resistor to change the amount of the length of the resistor is within the boundary layer, the second resistor will have the amount of its length within the boundary layer changed in the opposite amount of the original resistor; and measurement means connected to both resistors so as to sense the electrical difference between the resistors.

5. A system as set forth in claim 4 wherein each nonlinear resistor take the form of a short length of fine platinum wire.

6. A system as set forth in claim 5 wherein said measurement means is a wheatstone-bridge having the two nonlinear resistors as two adjacent legs in the bridge network.

* * * * *